United States Patent [19]

Lalancette

[11] 4,170,932
[45] Oct. 16, 1979

[54] ELECTRONIC TOASTER CONTROL

[76] Inventor: Lionel Lalancette, 241 de la Bretagne St., Jonquière, Canada

[21] Appl. No.: 808,533

[22] Filed: Jun. 21, 1977

[51] Int. Cl.$^2$ ............................................. A47J 27/00
[52] U.S. Cl. ................................ 99/326; 99/329 RT; 99/331; 99/334; 219/502
[58] Field of Search ................. 99/324, 325, 326, 327, 99/328, 329 R, 329 RT, 331, 332, 334, 335, 337, 338, 385; 219/444, 524, 525, 494, 505, 510; 361/106

[56] References Cited

U.S. PATENT DOCUMENTS

| | | | |
|---|---|---|---|
| 3,229,614 | 1/1966 | Matzenauer | 219/514 X |
| 3,349,692 | 10/1967 | Jones | 99/331 |
| 3,636,858 | 1/1972 | Paaskesen | 99/329 RT |
| 3,956,978 | 5/1976 | Borley | 219/502 X |

Primary Examiner—Edward J. McCarthy

[57] ABSTRACT

An electronic control for controlling the degree of toasting of a bread slice in a toaster. The control includes a thermocouple located within the passage of the toaster for the bread slice and responsive to the temperature of the toaster casing, the slice of bread and the air temperature within the passage to produce a voltage proportional to the resultant temperature. This voltage is integrated and actuates an electronic pulse generator with an adjustable pulse width which produces a triggering pulse. This pulse is used to actuate a solenoid which unlatches the support for the bread slice. The operational amplifier has a predetermined output voltage of reference defining the threshold of operation of the pulse generator. The electronic control is very stable and, therefore, produces uniform toasting, since it integrates the time required to obtain the desired degree of toasting as a function of the temperature variation to which the bread slice is subjected.

7 Claims, 4 Drawing Figures

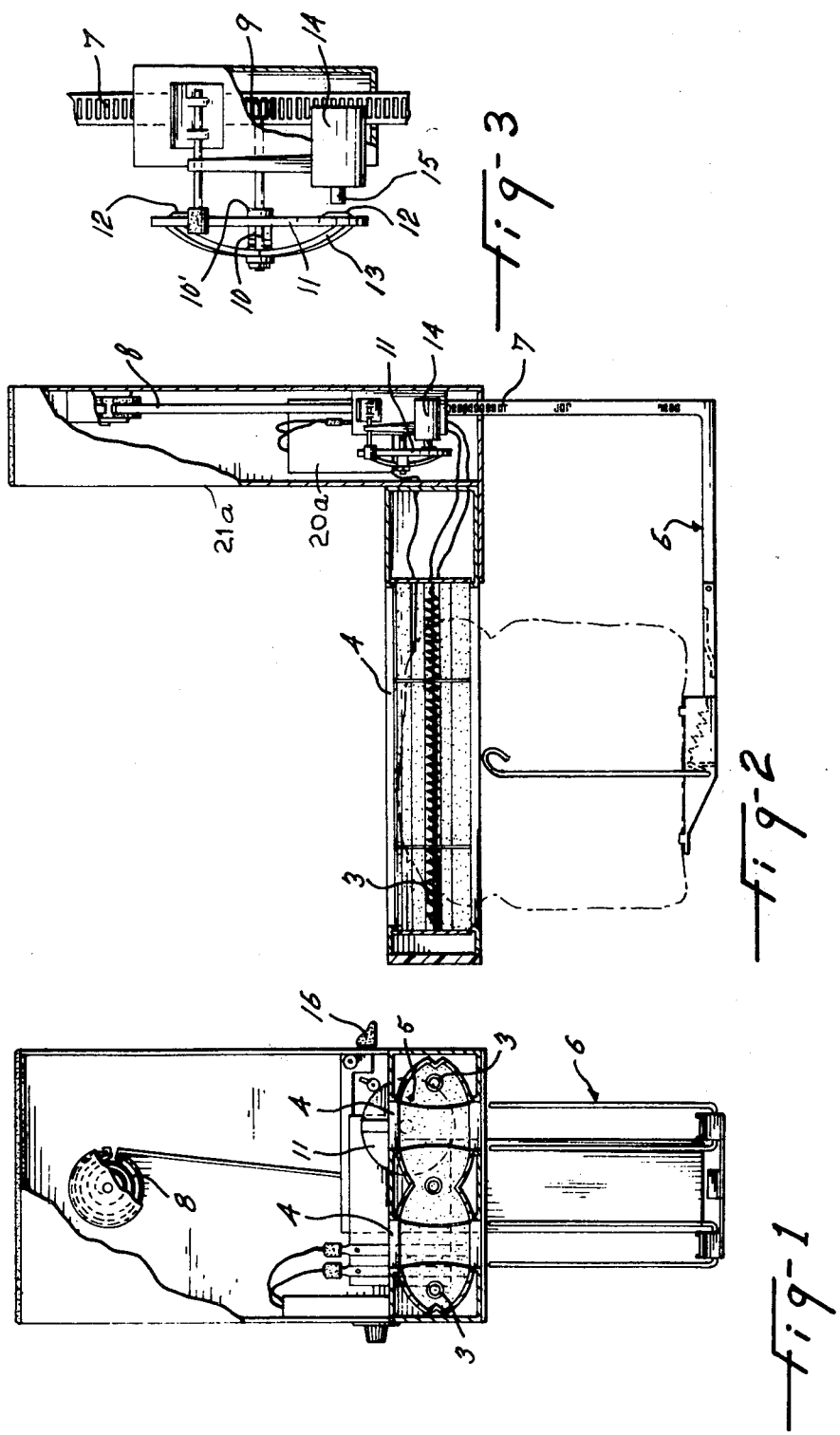

ELECTRONIC TOASTER CONTROL

This invention relates to toasters and, more particularly, to an electronic control assembly for toasters of the types defined in my copending patent application Ser. No. 778,020 dated Mar. 16, 1977, now U.S. Pat. No. 4,098,178 entitled: "WALL TOASTER" and in my co-pending patent application Ser. No. 804,803 dated June 8, 1977 and entitled: "TOASTER FOR STEP-BY-STEP TOASTING".

It is a general object of the present invention to provide an electronic control assembly for toasters which is of low cost construction and yet which is very stable in that it produces a very uniform degree of toasting, being mainly characterized by the fact that it integrates the time required to obtain the desired degree of toasting as a function of the temperature variation to which the bread slice is subjected during toasting.

It is another object of the invention to provide an electronic control for toasters of the type comprising two toaster casing sections hinged to each other, one section being stationarily supported and the other section enclosing the toasting elements, and wherein the control includes a temperature sensing element located adjacent one of the electric toasting elements, whereas the electronic parts of the assembly are all located in the stationarily mounted toaster section in a way as to be shielded from the high temperature of the toasting section.

Another object of the present invention is to provide an electronic control assembly more particularly adapted to be used in a toaster of the type wherein the slice of bread is displaced edgewise step by step between electric toasting elements to toast the bread strip by strip progressively across the same.

It is another object of the present invention to provide an electronic control assembly for a toaster of the above type, which produces the same uniform toasting of all the successive strips irrespective of the temperature variations in the passage for the slice of bread between the toasting elements.

It is a more specific object of the present invention to provide an electronic control assembly for a toaster of the above type and which produces sharp pulses to positively and timely actuate a solenoid and control stepwise displacement of each slice of bread.

It is a further object of the present invention to provide an electronic control assembly for a toaster of the above type and which uses an operational amplifier to trigger a pulse generator and to allow presetting the threshold of operation of the pulse generator.

It is still another object of the present invention to provide an electronic control assembly for a toaster of the above type and which is actuated by a temperature sensing device of low cost and reliable and efficient operation.

It is yet another object of the present invention to provide an electronic control assembly of the character described, in which the temperature sensing device is located in the passage for the bread slice, so as to read the resultant of the temperature of the bread slice surface being toasted, the temperature of the air in the passage and the temperature of the surrounding toaster casing and parts, so as to give a signal proportional to the resultant temperature.

The above and other objects and advantages of the present invention will be better understood with reference to the following detailed description of a preferred embodiment thereof which is illustrated, by way of example, in the accompanying drawings in which:

FIG. 1 is a front view of an electric toaster embodying an electronic control assembly according to the present invention, the wall section of the toaster being shown with its front wall partially removed and the toasting section being shown in cross-section;

FIG. 2 is a side view partly in cross-section of the toaster of FIG. 1, the wall section being shown partly in elevation and partly in longitudinal section and the toasting section being shown in longitudinal section;

FIG. 3 is a partial and enlarged scale view of a solenoid controlling stepwise actuation of the support for the slices of bread.

Figure 4:
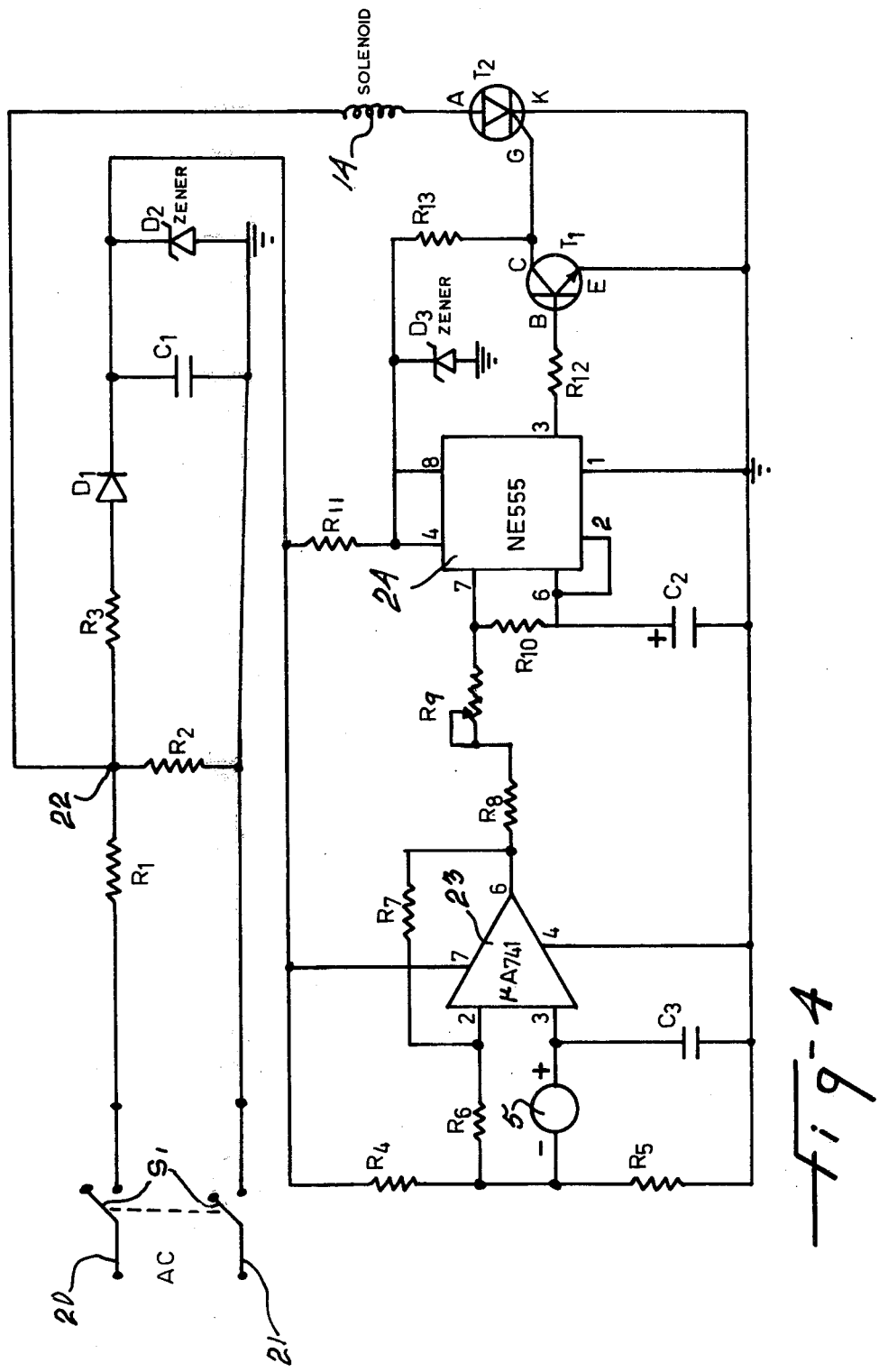
FIG. 4 is a circuit diagram of an electronic control assembly operating the toaster of FIGS. 1, 2, and 3 according to the present invention.

The electronic control assembly according to the present invention is adapted for a toaster wherein each slice of bread is toasted strip by strip by edgewise displacement of the slice step by step between electric toasting elements. A toaster of the above type is illustrated in FIGS. 1, 2, and 3 and is briefly described hereinafter. A detailed description of this toaster forms part of the afore-mentioned patent application entitled: "TOASTER FOR STEP-BY-STEP TOASTING."

FIGS. 1, 2, and 3 of the present invention correspond to the embodiment of the last-mentioned patent application illustrated in FIGS. 20 to 26. However, the electronic control assembly of the invention is equally applicable to the embodiment illustrated in FIGS. 1 to 14 and of the embodiment of FIGS. 15 to 19. The electronic control assembly of the invention is also applicable to the toaster illustrated and described in my co-pending U.S. Pat. application Ser. No. 778,020 dated Mar. 16, 1977 and entitled: "WALL TOASTER," now U.S. Pat. No. 4,098,178.

The illustrated toaster includes a wall section 1 and a toasting section 2 which are hinged together to selectively open the toasting section to the operative toasting position shown in FIGS. 1 and 2.

The toasting section 2 includes three electric toasting elements 3 which are laterally spaced apart one from another by a toasting passage upwardly registering with a slot 4 in the toasting section 2. A thermocouple 5 is mounted in the toasting section 2 adjacent one toasting passage to measure the heat in the latter. An L-shape support 6 is provided to carry a pair of slices of bread in registry with the two toasting passages between the electric elements 3.

The L-shaped support 6 includes an upright portion 7 formed with a series of apertures defining the teeth of a gear rack. A coil spring 8 is mounted in the wall section 1 and connected to the upright portion 7 to form an actuator upwardly biasing the L-shaped support 6.

A pinion gear 9 is fixed to a shaft 10 to rotate therewith and meshes with the teeth of the gear rack portion 7. Wheel 11 is rotatably mounted on the shaft 10 and has a pair of lugs or projections 12 projecting from one face and at diametrically opposite points thereof. A resilient spider member 13 axially biases wheel 11 in clutching engagement against a washer 10' fixed to shaft 10. Thus, the washer 10' transmits the rotation of the pinion gear 9 and of the shaft 10 to the wheel 11 by its frictional clutching engagement therewith.

A solenoid 14 is mounted adjacent the wheel 11 and includes a plunger 15 axially displaceable to rotatively intercept one of the lugs 12 and thus stop the pinion 9 and the upward displacement of the support 6. The support is set to its initial toasting position by pressing down the thumb piece 16 which is connected to the support. A switch is connected to the support 6 to be closed by the latter when reaching its initial toasting position.

The electronic toaster control assembly according to the present invention includes, in addition to thermocouple 5, an AC supply to produce an AC input voltage between a pair of conductors or wires 20 and 21. The afore-mentioned switch is represented as S1 in FIG. 4 and is connected to the conductors 20 and 21 such that, when the support 6 is lowered to its initial toasting position, the three toasting elements 3 are series connected in the AC input circuit in which two elements 3 are represented by resistor R1 and the third element 3 by resistor R2. A lower electric potential is obtained at the point 22 between the two resistors R1 and R2 which form a voltage divider.

A voltage rectifying circuit is connected to the contact point 22 and includes a voltage reducing resistor R3, a diode D1, a filter capacitor C1 and a voltage regulator Zener diode D2.

The electronic control assembly further includes an operational amplifier 23, used also as a DC control circuit, and an integrated circuit timer used as a pulse generator 24 with adjustable pulse width. The input number 2 of the amplifier 23 is biased with a predetermined reference voltage through connection to a voltage divider line defined by a pair of resistors R4 and R5. By presetting or selection of the resistors R4 and R5, the voltage of reference at the input number 2 may be preset to produce an output voltage at number 6 of the amplifier which is lower than the triggering threshold voltage of the pulse generator 24. This avoids premature triggering of pulse generator at low toasting temperature. This presetting of the reference voltage sets the minimum or threshold triggering temperature at the start of the toasting cycle for a slice of bread. The amplifier 23 is provided with a feedback loop including reisistors R7 and R6 and thermocouple 5. The aforementioned thermocouple 5 is connected to the control input number 3 of the amplifier 23. A filtering capacitor C3 is connected between the input number 3 and the ground. The thermocouple, as clearly shown in FIG. 1, is so located in the passage 4 for the slice of bread that it will read the resultant of the temperature of the air within the passage, the temperature of the bread portion within the passage and the temperature of the toaster casing, element 3 and the reflector for the element 3.

The thermocouple 5 responds to the temperature in the passage between a pair of electric toasting elements to generate a voltage at the input nunber 3, which is proportional to the temperature of the thermocouple. This voltage is amplified by amplifier 23 to produce an amplified output voltage at number 6 of the amplifier, which is proportional to the toasting temperature. The output of the amplifier 23 is fed through resistor R8, potentiometer R9 and resistor R10 to a capacitor C2 and to the inputs numbers 2, 6, and 7 of the pulse generator 24. R10 also serves to adjust the width of the pulse produced by generator 24.

After the capacitor C2 has been charged by the amplifier output the pulse generator 24 is activated to produce a sharp square shaped pulse at the output thereof which is amplified by the transistor T1 and which renders the silicon-controlled rectifier T2 conductive. The solenoid 14 of FIGS. 2 and 3 is therefore actuated. There results a pulse of adjusted and limited duration through the solenoid to positively retract the plunger 15 and ensure that the spring-loaded plunger will return to intercept the following abutment lug 12.

The afore-described electronic control circuit ensures that each stepwise operation of the solenoid is precisely controlled as to its duration to obtain uniform toasting of the bread slice without having to change the setting of potentiometer R9.

This is achieved by the fact that the thermocouple 5 produces a voltage proportional to the sensed temperature in the toaster and a voltage at 6 of the amplifier which is thus also proportional to this temperature. As a result, the time for charging the capacitor C2 is inversely proportional to the output voltage at 6. Consequently, the higher is the temperature, the faster are produced the pulses in the generator 24 and the faster is the stepwise operation of the solenoid.

As a result, each stepwise operation of the solenoid produces the same amount of toasting of each strip of bread which is in registry with the rectilinear toasting elements 3.

It follows that, once potentiometer R9 is set for a desired degree of toasting, the bread slices will be uniformly toasted to that degree without further handling of potentiometer R9.

Thermocouple 5 has a small diameter and a light mass. Therefore, it has a low thermal inertia. It thus responds very quickly to temperature variation, resulting in accurate integration by condenser C2 of the amount of heat necessary for pulse generator 24 to produce a pulse. It should be remembered that to toast a slice of bread, about 13 pulses are required. For a cold toaster, the first pulse will last as long as 35 seconds, while the last pulse will be about 4 seconds. This varies considerably in accordance with the temperature of the toaster during a toasting cycle and also subject to the degree of humidity of the bread slice being toasted. Increasing the resistance of potentiometer R9 results in a slower charging rate of capacitor C2 and in a slower rate of pulse production. Consequently, a higher degree of toasting is obtained. In the circuit diagram of FIG. 4, R12 is a resistor to produce a bias on the base of the transistor T1; R13 is a resistor to apply a load on the collector of transistor T1; R11 is a dropping resistor and Zener diode D3 lowers and stabilizes the voltage for the input 4 and 8 of pulse generator 24 and for resistor R13.

It should be noted that all of the electronic components, shown in FIG. 4, except the thermocouple 5, are located in a block 20a housed within the stationary toaster casing part 21a of the foldable toaster, as shown in FIG. 2. Thus, all of the electronic components are clearly protected and shielded against the high temperature of the toasting section and, more particularly, of electric toasting elements 3.

Obviously, if the solenoid 14 is sensitive enough, the transistor T1 and the silicon-controlled rectifier can be dispensed with and the output of the pulse generator directly connected to the solenoid.

When a linear motor, such as shown in the first and second embodiments of my co-pending patent application entitled: "TOASTER BY STEP-BY-STEP TOASTING", is used, the pulse at the output of the pulse generator can be used to control a shifting circuit to operate in the required sequence the three solenoids of the linear motor.

I claim:

1. An electronic control assembly for a toaster including electric toasting elements on each side of a passage for receiving a slice of bread, a spring-loaded movable support for said slice of bread and a solenoid-controlled unlatching actuator device to unlatch said support and allow its movement under the action of said spring, said electronic control assembly comprising a temperature responsive transducer located in said passage adjacent said slice of bread and one of said electric toasting elements, a series-connected capacitor and resistor connected to said transducer and integrating the variable electric values of siad transducer as a function of the variable temperature to which it is subjected, and a pulse generator connected to said capacitor circuit and responsive to a minimum voltage to produce a pulse to actuate the solenoid of said unlatching device to unlatch said support.

2. An electronic toaster control assembly as defined in claim 1, wherein the toaster comprises a stationarily mounted section and a toasting section hinged to said first-named section, said toasting section including said electric toasting elements and said transducer while said capacitor, said resistor and pulse generator and said solenoid are mounted in said first-named section and shielded from the high temperature of said toasting section.

3. An electronic toaster control assembly as claimed in claim 2, wherein said solenoid is actuated for step-by-step operation to produce toasting of successive strips across the same slice of bread, said transducer being a thermocouple generating an output voltage proportional to the temperature sensed by said thermocouple, an operational amplifier for amplifying the voltage of said thermocouple, said capacitor and resistor being series connected to the output of said amplifier, whereby the capacitor is charged at a rate in direct relation with the output voltage of said amplifier, said pulse generator being connected to said capacitor and becoming operative to generate a pulse upon said capacitor attaining a predetermined charge, said pulse generator repeatedly energizing said solenoid in response to a predetermined amount of heat successively measured by the thermocouple.

4. An electronic toaster control assembly as claimed in claim 3, wherein said amplifier has a reference input set at a predetermined bias voltage and a controlling input, said thermocouple being connected to said controlling input.

5. An electronic toaster as claimed in claim 4, wherein said capacitor is connected to the controlling input of said pulse generator and further including a manually-controlled variable resistor connected in series between the output of the operational amplifier and the capacitor, to obtain the desired degree of toasting.

6. An electronic toaster control assembly as defined in claim 5, further including a silicon-controlled rectifier connected to the output of said pulse generator and to said solenoid and operatively triggering the operation of the latter.

7. An electronic toaster control assembly as defined in claim 6, further including an AC input circuit and a rectifying circuit, the AC input circuit includes a switch operatively associated to said movable support and operatively responsive to arrival and departure of the movable support relative to an initial toastng position thereof, the AC input circuit includes said electric toasting elements connected intermediate said switch and said rectifying circuit, the latter is connected to and operatively energizes said electronic control assembly.

* * * * *